UNITED STATES PATENT OFFICE.

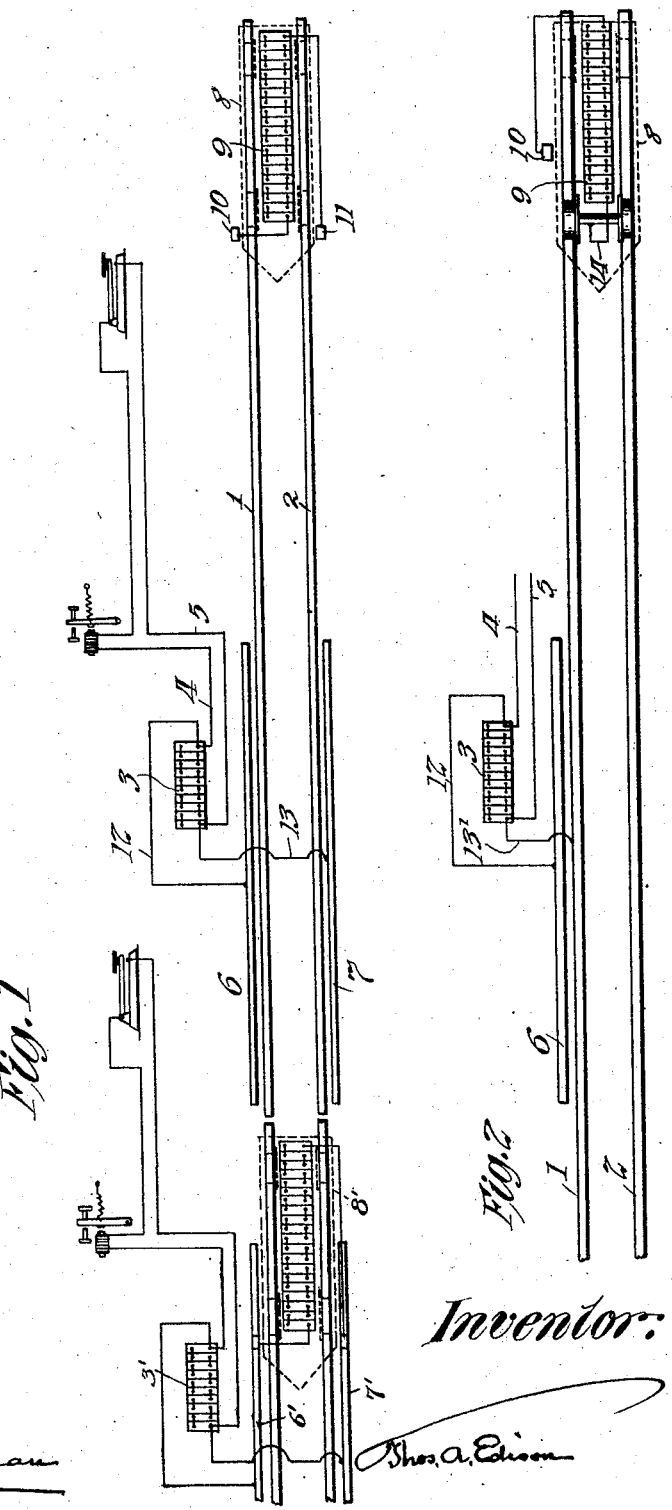

THOMAS A. EDISON, OF LLEWELLYN PARK, WEST ORANGE, NEW JERSEY.

CHARGING STORAGE BATTERIES.

1,143,818.

Specification of Letters Patent. Patented June 22, 1915.

Application filed January 17, 1912. Serial No. 671,755.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Charging Storage Batteries, of which the following is a specification.

My invention relates to a method and means of charging storage batteries, and more particularly storage batteries located along railways which are used to supply current to signal and control circuits. Such batteries are usually located in the signal towers and semaphores or in battery wells along the track, and one of the objects of my invention is to render it unnecessary to remove the batteries to distant points for the purpose of recharging them.

Other objects of my invention will be hereinafter set forth.

In the further description of my invention, reference is had to the drawings accompanying and forming a part of this specification, and in which—

Figure 1 represents diagrammatically one embodiment of means for charging a storage battery in accordance with my invention; and Fig. 2 represents a modification thereof.

Referring to the drawings, and particularly to Fig. 1, at 1 and 2 are represented track rails of a railway, and at 3 is represented a storage battery adapted to supply current to a signal or control circuit 4, 5. At 6 and 7 are represented charging terminals for the storage battery 3, and these charging terminals may consist of two extra rails on the side of the track, raised and insulated therefrom, as is common in third rail electric systems. The rail 6 is connected to one terminal of the battery 3 by a conductor 12, and the rail 7 is connected to the other terminal of the battery by the conductor 13. The length of each of the two charging rails may be thirty feet or more. Similar charging terminals are provided for each signal battery along the railway. On a locomotive or other railway vehicle 8 is placed another storage battery 9, the terminals of which are connected to a double shoe or pair of shoes 10 and 11. The shoes 10 and 11 are adapted to contact with the rails 6 and 7 respectively as the railway vehicle 8 passes the point at which the battery 3 and the charging terminals 6 and 7 are located. As the train containing the railway vehicle 8 passes the signal station containing the battery 3, and the shoes 10 and 11 contact respectively with the charging rails 6 and 7, a heavy momentary charge is given to the signal battery 3. Similarly located charging rails are provided for the batteries at each signal station along the railway track, a second such battery being shown at 3' provided with charging rails 6' and 7'. During the passage of the train containing the railway vehicle 8 over a division or portion of the track traversed in its trip, each of the signal batteries is given a momentary heavy charge. The number of cells of the battery on the vehicle 8 is greater than the number of cells in a signal battery, and the capacity of the charging battery is sufficient to supply a heavy charge to the signal battery during the short period of contact between the shoes and the charging rails at each signal station. The charge is so proportioned by providing the railway vehicle with a battery of such a number of cells and capacity that with high speed trains, such as express trains, the rate of charging is very great, whereas on slow trains, such as freight trains, the rate is less, but the total charge supplied to a signal battery during each period of contact between the charging rails and the shoes is substantially the same. In this manner the signal storage batteries may be fed with more current than is ever given out by the working of the signals, and the signal batteries are thus always kept adequately charged. The battery on the locomotive or the railway vehicle 8 may be charged as often as necessary, for example, once or twice a month, at a terminal station. This battery may also be used in connection with the lighting system of the train, as for example, to light the electric headlight for the locomotive. At 8' is shown a second locomotive or railway vehicle provided with a charging battery.

Instead of employing two extra rails 6 and 7 for charging terminals, a single rail and one or more of the track rails may be employed for this purpose. For example, the rail 7 and the shoe 11 may be dispensed with. In this modification as illustrated in Fig. 2 of the drawings, one terminal of the battery 3 is connected to the charging rail 6 by the conductor 12 and the other terminal of the battery 3 is connected to one or more of the track rails 1 by the conductor 13'. One terminal of the battery 9 is connected to a shoe 10 adapted to contact with the rail 6 as the vehicle passes the said rail, and the other terminal of the battery 9 is connected by a conductor 14 to some part of the vehicle 8 or an attachment thereto in electrical contact with the track rail 1. In Fig. 2 I have illustrated the conductor 14 connected to the vehicle axle, through which electrical connection is made to the track rails. Where this modification is employed, like poles of all of the signal batteries located along the railway are connected to the track rails 1. Otherwise than as stated herein, the arrangement of apparatus is the same in Fig. 2 as in Fig. 1. In both modifications the shoe 10 and the rail 6 are connected to like poles of the batteries.

Storage batteries of the Edison type, such as are described in my prior patents, are particularly adapted for use in the system hereinbefore described, inasmuch as batteries of this type are capable of discharging and of being charged at enormously high rates, and are not injured by such high currents or by overcharging.

Having now described my invention, what I claim as new therein and desire to protect by Letters Patent of the United States is as follows:—

1. The method of charging storage batteries located at intervals along a railway, which consists in providing a suitable vehicle with a source of current, and connecting each of the batteries to the said source during the period of time occupied by the railway vehicle in passing over a short distance predetermined for each battery, substantially as set forth.

2. The method of charging storage batteries located at intervals along a railway track, which consists in supplying current to each of the batteries from sources carried by passing trains, the rate of charge from each such source being inversely approximately proportional to the average speed of the train carrying it, substantially as set forth.

3. In a system of the class described, a railway track, a plurality of storage batteries located at intervals along said track, and a charging terminal for each of said storage batteries adapted to contact with a contact terminal located upon a railway vehicle during the passage of the vehicle thereby, substantially as described.

4. In a system of the class described, a railway track, a plurality of storage batteries located at intervals along said track, and a pair of conducting rails for each storage battery located parallel to the track and insulated therefrom, each of said pairs of rails constituting charging terminals for the storage battery associated therewith, substantially as described.

5. In a system of the class described, a railway track, a plurality of stationary storage batteries located at intervals along said track, a railway vehicle adapted to travel on said track and provided with a storage battery having a terminal contact and containing a greater number of cells than any one of said stationary storage batteries, and a charging terminal for each of said storage batteries, said charging terminals being in fixed relation to the track and adapted to contact with the terminal contact of the storage battery of the railway vehicle throughout predetermined distances of travel of the railway vehicle, substantially as described.

6. In a system of the class described, a plurality of storage batteries located at intervals along a railway, circuits connected to be supplied individually from said storage batteries, and charging terminals for said storage batteries adapted to be electrically connected to a battery carried by a railway vehicle during the passage of the vehicle thereby, substantially as described.

This specification signed and witnessed this 12th day of January, 1912.

THOS. A. EDISON.

Witnesses:
HENRY LANAHAN,
ANNA P. KLEHM.